(12) United States Patent
Torii et al.

(10) Patent No.: US 7,604,763 B2
(45) Date of Patent: Oct. 20, 2009

(54) METHOD FOR MANUFACTURING VALVE UNIT

(75) Inventors: Katsuya Torii, Anjo (JP); Masamichi Akagawa, Kariya (JP); Yasushi Kawano, Anjo (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 11/641,772

(22) Filed: Dec. 20, 2006

(65) Prior Publication Data

US 2007/0138693 A1 Jun. 21, 2007

(30) Foreign Application Priority Data

Dec. 20, 2005 (JP) ............... 2005-366131

(51) Int. Cl.
*B29C 45/14* (2006.01)
(52) U.S. Cl. .............. 264/242; 264/250; 264/328.8; 123/337
(58) Field of Classification Search .......... 264/242, 264/250, 328.8; 123/337
See application file for complete search history.

(56) References Cited

U.S. PATENT DOCUMENTS

| | | | |
|---|---|---|---|
| 4,414,170 A | | 11/1983 | Sano |
| 4,499,347 A | * | 2/1985 | Richards ............... 200/81.9 M |
| 5,113,904 A | * | 5/1992 | Aslanian ................ 137/556 |
| 5,190,190 A | * | 3/1993 | Fudalla ................ 222/105 |
| 5,715,782 A | | 2/1998 | Elder |
| 5,989,469 A | * | 11/1999 | Dirr ..................... 264/255 |
| 6,416,700 B1 | * | 7/2002 | Hatagishi et al. ......... 264/242 |
| 6,427,975 B1 | | 8/2002 | Powell |
| 6,889,867 B1 | * | 5/2005 | Smith .................. 221/33 |
| 6,979,130 B1 | | 12/2005 | Stangier et al. |
| 7,047,935 B2 | | 5/2006 | Arai et al. |
| 2005/0012240 A1 | * | 1/2005 | Eimura ................ 264/245 |
| 2005/0022365 A1 | * | 2/2005 | Arai et al. ............. 29/527.1 |
| 2005/0097745 A1 | | 5/2005 | Arai |
| 2005/0206036 A1 | * | 9/2005 | Seeger ................ 264/242 |
| 2007/0028891 A1 | | 2/2007 | Akagawa |
| 2007/0051339 A1 | * | 3/2007 | Torii et al. ............ 123/336 |
| 2007/0114250 A1 | * | 5/2007 | Langseder et al. ....... 222/494 |
| 2007/0144483 A1 | | 6/2007 | Torii et al. |

FOREIGN PATENT DOCUMENTS

| | | |
|---|---|---|
| JP | 10-259768 | 9/1998 |
| JP | 2007-40282 A | 2/2007 |
| JP | 2007-46470 A | 2/2007 |

* cited by examiner

*Primary Examiner*—Joseph S. Del Sole
*Assistant Examiner*—Jeremiah Smith
(74) *Attorney, Agent, or Firm*—Nixon & Vanderhye P.C.

(57) ABSTRACT

A method of manufacturing a valve unit is disclosed that includes providing a plurality of injection molding dies that define a cavity corresponding in shape to the valve unit. The valve unit includes a housing and a valve, and the housing defines a fluid flow path with an axis having an upstream direction and a downstream direction corresponding to a predetermined direction of fluid flow in the fluid flow path. The valve is cantilevered and includes a valve body having a coupled end rotationally coupled to the housing and a free end, and the valve body rotates about the coupled end to thereby change flow through the fluid flow path. The method also includes simultaneously molding the housing and the valve within the cavity such that the valve body is formed with the free end extending away from the downstream direction of the axis of the fluid flow path.

12 Claims, 12 Drawing Sheets

METHOD FOR MANUFACTURING VALVE UNIT

CROSS REFERENCE

The following relates to and claims priority to Japanese Patent Application No. 2005-366131, filed Dec. 20, 2005, which is hereby incorporated by reference in its entirety.

FIELD

The present invention relates to a valve unit and, more particularly, to a method for manufacturing a valve unit in which a cantilever valve is received inside a housing so as to open and close therein.

BACKGROUND

A valve unit has been proposed with a housing that defines a fluid (e.g., air) flow path in communication with cylinders of an internal combustion engine. The valve unit also includes a valve coupled to the housing so as to rotate relative to the housing. The valve unit is resin-molded. (Refer to, for example, JP-2005-54627A, pages 1 to 17, FIGS. 1 to 8). This valve unit reduces weight, improves heat insulation properties, and allows for significant design freedom.

The valve unit is made by simultaneously molding the housing and the valve with the same resin material inside the molding die. The valve unit is molded with dies that abut at a seam. The valve unit is molded such that the valve is formed in the fully closed position within the housing (i.e., perpendicular to the axis of the fluid flow path). In addition, the valve shaft is provided in the molding die before the molten molding material is introduced into the die such that the valve shaft is insert-molded inside and coupled to the valve. To withdraw the molded valve unit from the dies, the dies are moved away from each other approximately parallel to the axis of the fluid flow path within the housing.

However, where the valve is a cantilever type (i.e., where the valve shaft is offset from the center of the valve), this manufacturing method can be problematic. For instance, as shown in a comparison example 1 (refer to FIGS. 12A and 12B) to be described later, the housing 101 includes upper and lower walls 102, 103. Space between the lower wall 103 and the valve shaft portion 105 is less than in the valve unit described in JP-2005-54627A. Thus, the conventional molding technique described above may not be suitable for manufacturing the valve unit with cantilevered valves. More specifically, the housing 101 and the valve 104 are molded in a state where the valve is in a fully open position. The molding die space between the lower wall 103 of the housing 101 and the valve 104 may be insufficient such that the sheet thickness is thin and the strength is reduced.

In partial response to this problem, an applicant of this application filed Japanese Application 2005-228278 (Date of Submission: Aug. 5, 2005—hereinafter referred to as "comparison example 1") for the purpose of allowing for adequate strength of the molding die. More specifically, FIGS. 9, 12A and 12B show the valve unit installed in an intake manifold. The valve unit is provided with the housing 101, the valve 104, and the shaft portion 105. The shaft portion 105 extends axially through holes 106, 107 opened in the flow path wall surface of the housing 101 and the shaft portion 105 is rotatably supported through the bearing components 108, 109 by the housing 101. FIGS. 10A and 10B show an injection molding method for simultaneously molding the housing 101 and the valve 104 of the valve unit of the comparison example 1.

The molding die is composed of at least six division slide cores 111-116. A resin material feeding device 119 feeds resin material to a first cavity corresponding to the shape of the housing 101 and a second cavity corresponding to the shape of the valve 104.

According to the injection molding method, a pellet-shaped resin material is heated and the molten resin material is injected into the molding die subject to pressures to produce a resin-molded element. Then, the resin-molded element is cooled and the dies are removed. Thereafter, the bearing components 108, 109 are press-fit between the respective through hole 106, 107 and the shaft portion 105.

When the valve 104 is in the fully open position, the "extension direction" of the valve 104 is substantially parallel to the fluid flow direction through the housing 101 (as indicated by the arrow pointing left in the housing 101 in FIG. 12A) and the axis of the fluid flow passage. Thus, as shown in FIGS. 12A and 12B, since the housing 101 and the valve 104 are molded with the valve 104 in a fully open position, first and second recessed portions 131, 132 (FIG. 9) are included for the molding die to be inserted between housing 101 and the respective side of the valve 104. This is because first and second protruding portions 121, 122 (FIGS. 10A and 10B) are provided at both sides of the valve 104 in a valve axial direction of the division slide cores 111 and 112.

In addition, in the valve unit of the comparison example 1, when the valve 104 is in the fully closed position (fully closed angle ($\theta$)), the valve 104 is set in a slightly inclined angle relative to the axis of the fluid flow path 110 through the housing 101. The valve 104 extends downstream from the shaft portion 105 as shown in FIG. 12B. Therefore, the die used to form the valve 104 is moved in the downstream direction substantially along the axis of the fluid flow path when removing the valve unit from the dies. The recessed portions 131, 132 are included so as to extend from the vicinity of the shaft portion 105 toward the downstream side of the valve 104.

Accordingly, when the valve unit in the comparison example 1 is installed in the intake manifold and the valve 104 is in the fully open position, as shown in FIG. 9, the fluid flow from an inlet port of the housing 101 into the fluid flow path 110 passes through the shaft portion 105 of the valve 104. Thereafter, the fluid flow can separate along the front and back surfaces of the valve 104 and can flow out from an outlet port of the housing 101 to the cylinder of the internal combustion engine. However, since a part of the fluid flowing along the fluid flow path 110 flows into the first and second recessed portions 131 and 132, a disturbance can occur in the fluid flow.

Disturbance in the fluid flow can cause abnormal sounds to develop including whistling or the like or an increase in pressure loss of the fluid flow passing through the fluid flow path 110. When the pressure loss of the fluid flow increases, an intake fluid quantity (i.e., a flow quantity at the fully open position of the valve 104) introduced into the cylinder of the engine is reduced, and therefore, a required intake fluid quantity may not be achieved. As a result, the performance of the engine may be detrimentally affected.

In addition, the first and second recessed portions 131, 132 can increase the size of the housing 101. This can necessitate increased size of the valve unit as a whole and limit mounting options of the valve unit, both of which are undesirable.

SUMMARY

A method of manufacturing a valve unit is disclosed that includes providing a plurality of injection molding dies that define a cavity corresponding in shape to the valve unit. The valve unit includes a housing and a valve, and the housing defines a fluid flow path with an axis having an upstream direction and a downstream direction corresponding to a predetermined direction of fluid flow in the fluid flow path. The valve is cantilevered and includes a valve body having a coupled end rotationally coupled to the housing and a free end. The valve body rotates about the coupled end to thereby change flow through the fluid flow path. The method also includes simultaneously molding the housing and the valve within the cavity such that the valve body is formed with the free end extending away from the downstream direction of the axis of the fluid flow path.

BRIEF DESCRIPTION OF THE DRAWINGS

Other objects, features, and advantages will become more apparent from the following detailed description made with reference to the accompanying drawings, in which like portions are designated by like reference numbers and in which.

DETAILED DESCRIPTION

First Embodiment

Figure 1A:
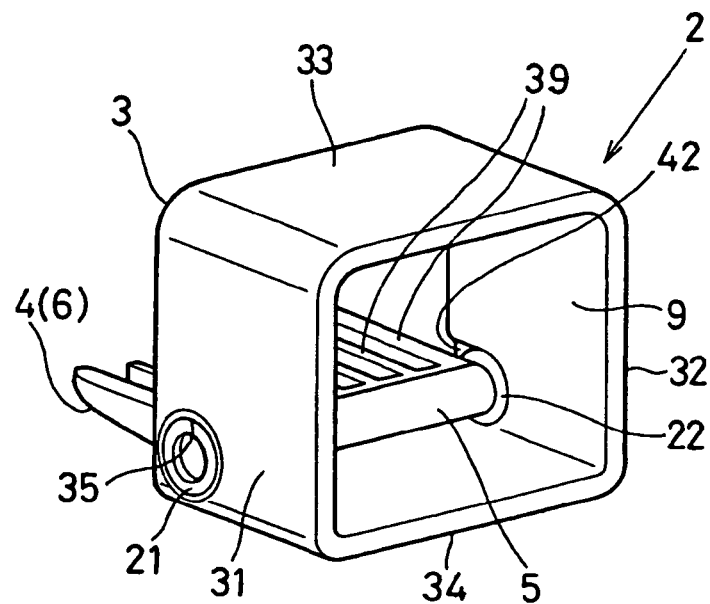
FIG. 1A is a perspective view showing a resin molded element in a first embodiment.

FIGS. 1A to 4B each show a first embodiment of an intake flow control device. In one embodiment, the intake flow control device is employed in an internal combustion engine as an intake flow generating device (i.e., a swirl generating device) which generates an intake swirl (i.e., tumble flow). As such, the intake flow control device promotes combustion of a mixture in each cylinder for a multi-cylinder internal combustion engine. The engine produces an output of heat energy obtained due to combustion of a mixture of intake air and fuel in a combustion chamber and is provided with an intake duct (i.e., engine intake pipe) for supplying the intake air into the combustion chamber in each cylinder of the engine body and an exhaust duct (i.e., engine exhaust pipe) for discharging an exhaust gas flowing out of the combustion chamber in each cylinder of the engine body through an exhaust emission purifying device and then out of the vehicle.

The engine body is provided with a cylinder head (not shown) connected air-tight to a downstream end of the intake duct and a cylinder block (not shown) forming combustion chambers into which the mixture is aspired from intake ports having a three-dimensional intake flow path configuration provided in the cylinder head. Spark plugs (not shown) are mounted in the cylinder head such that a tip part of the spark plug is exposed to the combustion chamber in each cylinder. Injectors are mounted in the cylinder head for injecting fuel into the intake ports at optimal timing. A plurality of intake ports formed in one side of the cylinder head are opened/closed by a poppet type intake valve (intake valve), and a plurality of exhaust ports formed in the other side of the cylinder head are opened/closed by a poppet type exhaust valve (exhaust valve).

Here, the intake duct is provided with an air cleaner case for receiving and retaining an air cleaner (filter element) that filters intake air, a throttle body connected at the downstream side in the flow direction of the intake air from the air cleaner case, a surge tank connected at the downstream side in the flow direction of the intake air from the throttle body, an intake manifold connected at the downstream side in the flow direction of the intake air from the surge tank, and the like. The intake manifold includes an intake multi-branch pipe for distributing and supplying the intake air flowing therein to the intake ports. In one embodiment, the intake manifold is resin-molded for reduced weight and cost reduction and is integrally formed by a resin material (for example, glass fiber reinforced thermoplastic resin).

In addition, the intake flow generating device is coupled to the intake duct for defining an intake passage in communication with the combustion chamber in each cylinder of the engine. The intake flow generating device is provided with a substantially rectangular casing 1. In one embodiment, the casing 1 is integrally connected to the intake duct of the engine.

The intake flow generating device also includes a plurality of valve units 2. In the embodiment shown, there are four valve units 2. However, it will be appreciated that the intake flow generating device could include any number of valve units 2. The valve units 2 are supported and fixed inside the casing 1.

In one embodiment, the valve units 2 are injection molded separately from the casing 1. Thus, as is widely known in the art, a plurality of injection molding dies that define a cavity are used. A molten resin is introduced into the cavity. The cavity corresponds in shape to the valve unit 2.

The valve unit 2 includes a housing 3. The intake flow generating device further includes a plurality of intake control valves 4 (i.e., a one-piece multiple intake flow control valve, first to fourth resin valves, tumble flow control valve (TCV), etc.). In one embodiment the intake control valves 4 are formed with resin. The valves 4 are each provided in one of a corresponding housing 3 in such a manner so as to open/close the fluid flow path defined within the housing 3.

A shaft portion 5 (hereinafter referred to as "valve shaft") is formed integrally with each of the intake flow control valves 4 in the vicinity of the rotational axis thereof (resin one-piece molding). Also, a common valve drive device (in this embodiment, a valve shaft 7) is included that uniformly changes the valve angle (i.e., rotational angle) of each intake flow control valve 4. That is, the intake flow generating device constitutes an intake flow control valve module (i.e., one-piece multiple type valve-opening/closing device) where a plurality of valve units 2 each receiving one resin valve 4 inside one resin housing 3 are arranged and aligned along the axis of the valve shaft 7 at certain intervals inside a common casing 1. In one embodiment, the valve shaft 7 has a polygonal cross section (e.g. rectangular) and is formed of an iron metal material.

Here, the valve drive device which closes/opens the plurality of the intake flow control valves 4 in the first embodiment is composed of an electric actuator equipped with a power unit including an electric motor for generating a drive force (motor output shaft torque) subject to power supply and a power transmission mechanism (gear reduction mechanism in the first embodiment) for transmitting a rotational motion of a motor shaft (output shaft) of the electric motor to the valve shaft 7. In one embodiment, the electric motor is a DC motor such as a brushless DC motor or a brush DC motor. In another embodiment, an AC motor such as a three-phase induction motor is used. The gear reduction mechanism reduces a rotational speed of the motor shaft of the electric motor to be in a predetermined reduction ratio and constitutes the power transmission mechanism for transmitting the motor output shaft torque of the electric motor to the valve shaft 7. Here, the valve drive device, particularly, the electric motor, is energized and controlled by an engine control unit (hereinafter referred to as "ECU").

The casing 1 in the first embodiment is a block (i.e., an automobile parts, an engine part, or a resin intake manifold) constituting a part (or entirety) of the intake manifold and is integrally formed to be in the shape of a box with a resin material such as thermoplastic resin. The casing 1 is provided with a plurality of engagement holes 11 (i.e., valve unit receiving part, first to fourth engagement holes, etc.) each receiving and retaining the housing 3 of the respective valve unit 2 (first to fourth valve units). The engagement hole 11 at least partially defines a fluid flow path as will be discussed. The casing 1 also includes a plurality of division walls for air-tightly dividing two neighboring engagement holes 11 (for example, between the first and second engagement holes, between the second and third engagement holes, between the third and fourth engagement holes, etc.).

In addition, in the casing 1, a plurality of shaft through bores 15 are arranged. The bores 15 extend straight in the direction orthogonal to the axis of the engagement holes so as to penetrate through all the engagement holes 11 and all the division walls 12.

Further, the casing 1 includes blocks 17 (first to fourth blocks) provided in each engagement hole 11. The blocks 17 are included in an upstream side of the engagement hole 11 and thus make the area of the upstream side smaller than the area of the downstream side. In the embodiment shown, the blocks 17 are integrally connected to the other portions of the casing 11. In the embodiment shown in FIG. 2, the top surface of the block 17 is substantially co-planar with the intake control valve 4 when the intake control valve 4 is in its fully open position. The engagement holes 11 of the casing 1 including the blocks 17 constitute a plurality of inlet ports 8 (first to fourth intake ports, fluid flow paths) for introducing the intake air into the respective housings 3 of the plurality of the valve units 2.

Peripheral edge portions 19 are included adjacent the downstream end of the engagement holes 11 of the casing 1. Rectangular grooves 20 (i.e., first to fourth grooves) are included that encompass the respective circumference of the open peripheral edge portion 19. A plurality of annular gaskets 29 (rubber elastic element or floating rubber) are included for creating an air-tight seal between the downstream end of the casing 1 and the remaining portion of the intake manifold or the upstream end of the intake ports.

Here, the plurality of the valve units 2 are provided in number so as to correspond to the number of the cylinders of the engine and are tumble flow control valve units composed of first to fourth valve units from the front end in the insert direction of the valve shaft 7 to the rear end thereof. Each of these valve units 2 includes an fluid flow path 9 (fluid flow path) having a rectangular cross section provided in each of the plurality of the housings 3. The shaft through holes 10 (i.e., through hole of the cantilever valve) extend straight in the direction orthogonal to the axis of each fluid flow path 9.

Each of the plurality of the housings 3 is a rectangular (or oblong), tubular element (frame element) and forms the fluid flow path 9. The housings 3 are located at the downstream side of the fluid flow path 8 in the casing 1. In one embodiment, the housings 3 are formed in predetermined shape with a resin material (for example, glass fiber reinforced thermoplastic resin). Each fluid flow path 9 is communicated with a corresponding cylinder (combustion chamber in each cylinder) of the engine body through a plurality of intake ports connected independently to the plurality of the valve units 2, respectively.

Figure 1B:
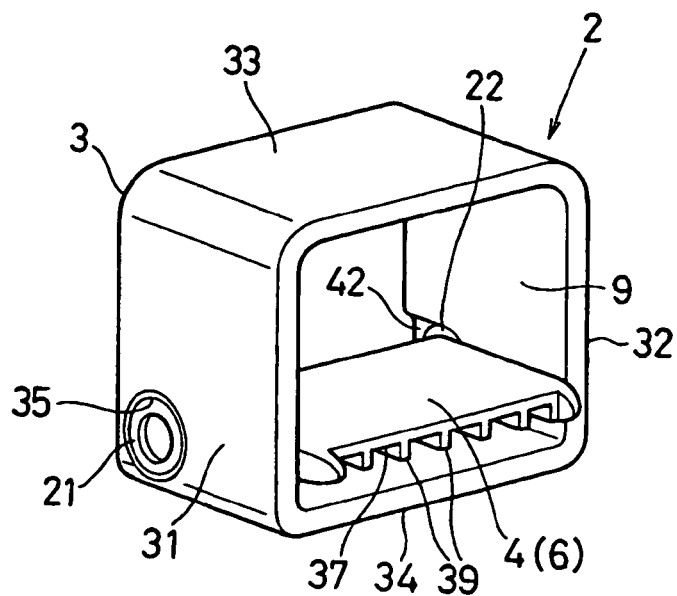
FIG. 1B is a perspective view showing a valve unit in the first embodiment.
Figure 4A:
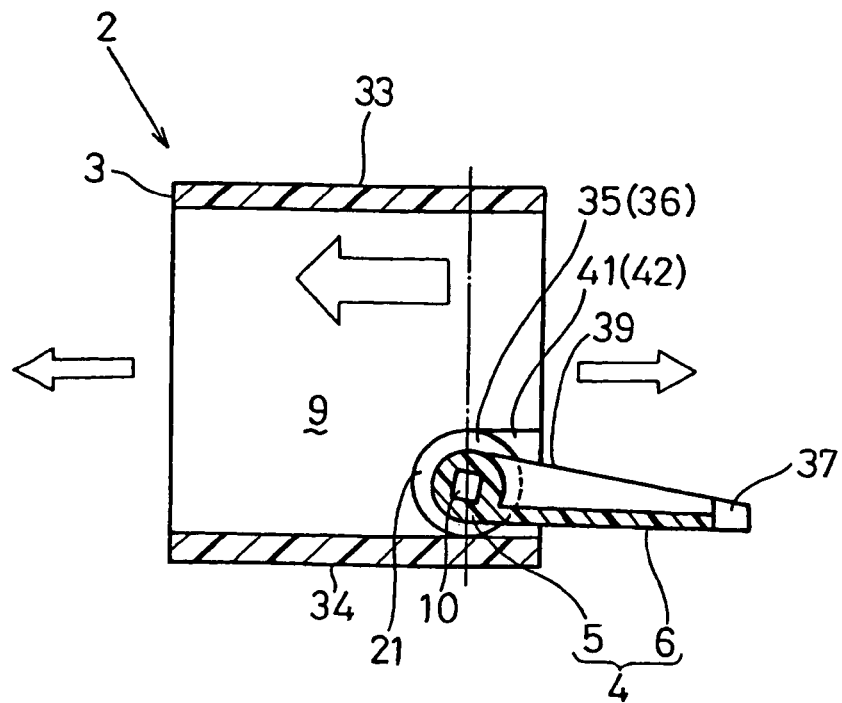
FIG. 4A is a sectional view of the valve unit of the first embodiment.
Figure 4B:
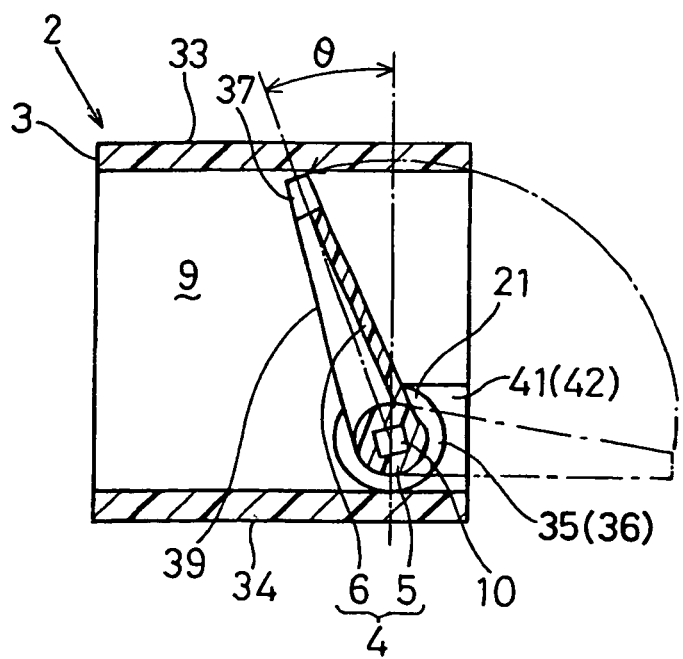
FIG. 4B is a sectional view of the valve unit of the first embodiment.

Each of the plurality of the housings 3 is, as shown in FIGS. 1A, 1B and 4A, includes four walls (i.e., first to fourth walls). The fluid flow path 9 is defined by the four walls so as to define an upstream end and a downstream end of the housing 3 corresponding to the predetermined fluid flow direction. As will be described below, dies are used to form the walls of the housing 3, and to remove the valve unit 2 from the dies, the dies are moved substantially along the axis of the fluid flow path 9.

The housing 3 is a rectangular (or oblong) frame element surrounding the circumference of the fluid flow path 9. As shown in FIG. 1A, the first wall 31 and the second wall 32 are separated at a distance and oppose each other so as to define two vertical sides of the fluid flow path 9 and so as to be substantially orthogonal to the axis of the fluid flow path 9. The top wall 33 and the bottom wall 34 are separated at a distance and oppose each other so as to define two horizontal sides of the fluid flow path 9 and so as to be substantially orthogonal to the axis of the fluid flow path 9.

In each housing 3, the top wall 33 and the bottom wall 34 are longer (or shorter) than the first and second walls 31, 32. The top wall 33 and the bottom wall 34 are provided with first and second flow path wall surfaces (hereinafter referred to as "top wall surface and bottom wall surface").

Each of the plurality of the housings 3 is provided with bearing holes 35 and 36 (hereinafter referred to as "first and second bearing holes 35, 36") extending through the first and second walls 31, 32, respectively. The bearing holes 35, 36 extend orthogonal to the axis of the fluid flow path 9. In the embodiment shown, the holes 35, 36 have a circular cross section. The first and second bearing holes 35, 36 are located so as to be adjacent to the bottom wall 34 and spaced from the top wall 33. Also, the bearing holes 35, 36 are located so as to be adjacent the upstream end of the fluid flow path 9 and spaced from the downstream end thereof.

First and second bearings 21, 22 are engaged and retained in an inner periphery of the first and second bearing holes 35, 36, respectively. In one embodiment, the first and second bearings 21, 22 are installed by press-fitting. The first and second bearing 21, 22 are each formed in a cylindrical shape with a resin material (for example, thermoplastic resin) (one-piece resin molding). First and second sliding bores having a circular cross section are formed inside the first and second bearings 21, 22 for slidably supporting both ends of the valve shaft 5.

The first and second side walls 31, 32 of the housing 3 in this embodiment include the first and second flow path surfaces (left side wall surface and right side wall surface, hereinafter referred to as "side wall surface").

As shown in FIGS. 1A, 1B, 4A, and 4B, first and second recessed portions 41, 42 are included in the first and second side walls 31, 32, respectively. The first and second recessed portions 41, 42 extend along the axial direction of the fluid flow path 9 from the upstream end to the first and second bearing holes 35, 36. The first and second recessed portions 41, 42 are grooves that are provided upstream of the valve body 6 and that extend substantially parallel to the axis of the fluid flow path 9 (i.e., approximately parallel to the direction the dies are moved when removing the valve unit 2 from the dies). In other words, the first and second recessed portions 41, 42 extend away from the valve shaft 5 away from the downstream direction of the axis of the fluid flow path 9. The recessed portions 41, 42 are formed at the time of simultaneously molding the housing 3 and the intake flow control valve 4.

The intake flow control valve 4 includes a rectangular sheet-shaped valve body 6. The valve body 6 is cantilevered such that the valve body 6 includes a rotating, coupled end, and a free end. The valve shaft 5 extends through the rotating end of the valve body 6 (opposite the free end of the valve body 6). As such, the valve shaft 5 defines the rotational center of the valve body 6. By rotating the valve body 6, the open area of the fluid flow path 9 is changed and flow through the fluid flow path 9 is changed. In FIG. 1B, the sheet-shaped valve body 6 of the intake flow control valve 4 is illustrated in a fully open position. In other words, the valve body 6 extends from the axis of rotation in the direction of fluid flow through the fluid flow path 9. In FIG. 1A, the valve body 6 is illustrated in a position opposite to the fully open position. In other words, the valve body 6 is rotated about the axis of rotation approximately 180° from the fully open position. As will be discussed in greater detail below, the valve body 6 is formed by molding such that the valve body 6 is formed positioned opposite to the fully open position (FIG. 1A).

Figure 3:
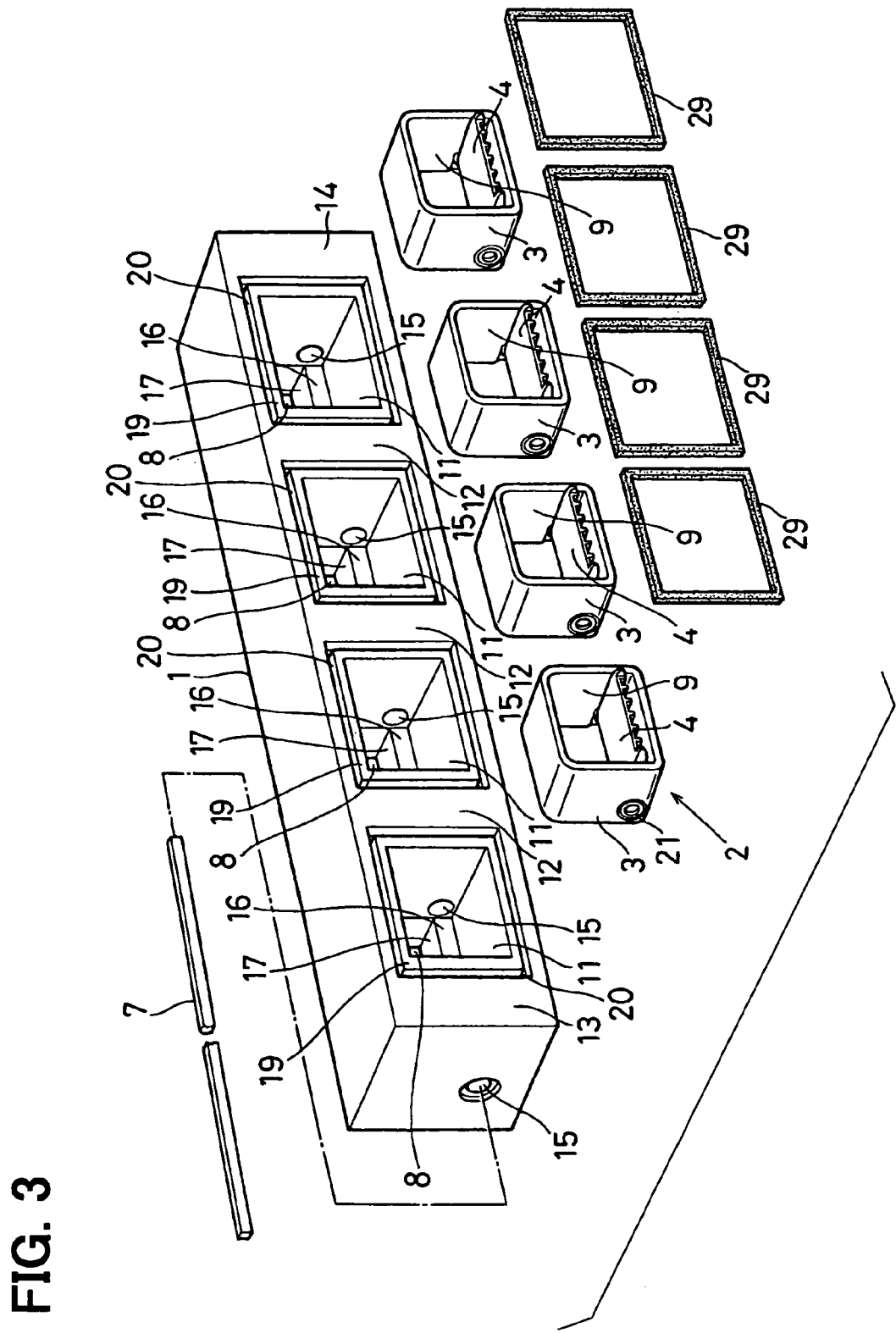
FIG. 3 is an exploded perspective view showing the intake flow control device of FIG. 2.

The valve shaft 5 is located adjacent the open end at the upstream side of the housing 3 and adjacent the bottom wall surface of the bottom wall 34 in the housing 3. More specifically, the valve shaft 5 is coupled to the housing 3 so as to be provided nearer the upstream end of the housing as compared to the downstream end. Also, the valve shaft 5 is coupled so as to be provided nearer to the bottom wall 34 as compared to the top wall 33. As such, as shown in FIGS. 1B and 3, as the plurality of the intake flow control valves 4 are set at a fully open position, the back surface of the valve body 6 is adjacent and oppose the bottom wall 34 in the housing 3 with a predetermined gap therebetween.

In one embodiment, the plurality of the intake flow control valves 4 are all formed in a predetermined shape with a resin material (for example, glass fiber reinforced thermoplastic resin) (one-piece resin molding). A rotational angle (valve angle) of the intake flow control valve 4 is changed within a rotational operating range from a fully open position where a flow quantity of the intake air flowing inside each fluid flow path 9 for each housing 3 is maximized to a fully closed position where a flow quantity of the intake air flowing inside each fluid flow path 9 for each housing 3 is minimized. Thus the intake flow control valve 4 opens/closes each fluid flow path 9 of the housing 3. It should be noted that the intake flow control valve 4 is biased toward the fully open position by a biasing member such as a coil spring.

In the embodiment shown, the valve body 6 of the intake flow control valve 4 is surrounded by four sections made of two sets of opposing sections to be formed in a rectangular shape. The upward and downward sections (upward and downward end surfaces or both side surfaces) positioned at both end sides in the upward and downward direction in the figure are shorter (or longer) than the right and left sections (right and left side surfaces or both side surfaces) positioned in both end sides in the right and left direction in the figure.

The intake flow control valve 4 is received inside the fluid flow path 9 of the housing 3 in such a way as to open/close (rotate) therein. In one embodiment, the central portion of the top end surface of the intake flow control valve 4 includes an open port 37 (FIG. 4B) for forming a desired intake flow between the housing 3 and the intake flow control valve 4 when the intake flow control valve 4 is in the fully closed position. In another embodiment, the open port 37 is not included such that there is less flow when the intake flow control valve 4 is in the fully closed position. In addition, the lower end surface or the right and left side surfaces of the intake flow control valve 4 may include a cutout to form an open port (slit) for forming a desired intake flow between the housing 3 and the intake flow control valve 4.

Further, in the end surface of the back surface among the front and back surfaces of the sheet-shaped valve body 6, a plurality of ribs 39 are formed in such a way as to gradually reduce in height from the valve shaft 5 to the tip end of the sheet-shaped valve body 6. The cylindrical valve shaft 5 extending in the axial direction is integrally formed in the vicinity of the rotational, central axis line constituting a rotational center of the sheet-shaped valve body 6 of the intake flow control valve 4. The shaft through hole 10 through which the valve shaft 7 penetrates in the axial direction is formed inside the valve shaft 5. The shaft through hole 10 is formed substantially in the same bore shape with the cross section of the valve shaft 7 to restrict a relative rotation between the intake flow control valve 4 and the valve shaft 7.

Figure 11A:
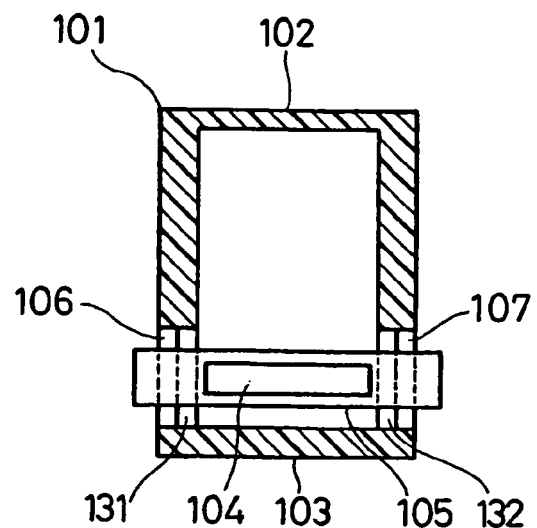
FIG. 11A is a sectional view of a valve unit of the prior art (i.e., comparison example 1)
Figure 11B:
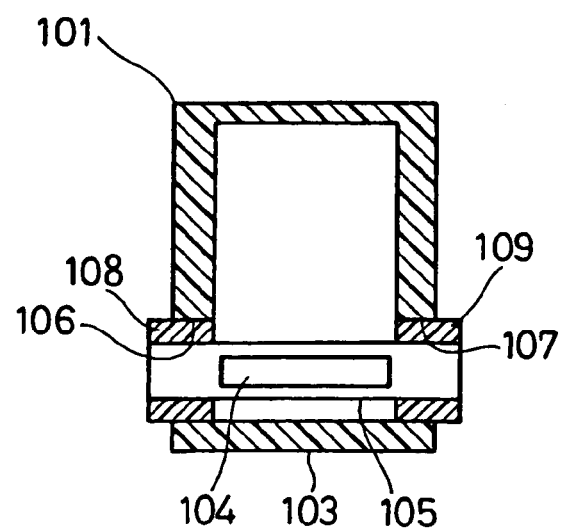
FIG. 11B is a sectional view of a valve unit of the prior art (i.e., comparison example 1)

The valve shaft 5 in the first embodiment is, at the time of simultaneously molding the housing 3 and the intake flow control valve 4, molded so as to protrude from opposite sides of the coupled end of the valve body 6 and is rotationally coupled to the housing (3) by being rotationally received in the first and second bearing holes 35, 36. Both the sides in the axial direction of the valve shaft 5 serve as the first and second rotating portions supported rotatably in the inner periphery of the first and second bearing holes 35, 36 through the first and second bearings 21, 22 (refer to FIGS. 11A and 11B of the comparison example 1).

The valve shaft 7 is inserted in and covered by the valve shaft 5 of the intake flow control valve 4 and the outer peripheral side thereof is rotatably supported through both ends (first and second sliding portions) in the axial direction of the valve shaft 5 by the first and second bearings 21 and 22. In addition, the plurality of the intake flow control valves 4 are respectively retained by and fixed to the single valve shaft 7.

In one embodiment, the thermoplastic resin used for the casing 1, the housing 3, and the intake flow control valve 4 is a polyamide resin (PA), a unsaturated polyester resin (UP), a polyphenylene sulfide (PPS), a polybutylene terephthalate resin (PBT) or the like so as have adequate heat resistance and strength. Also, the thermoplastic resin used for the first and second bearings 21, 22 is a resin material having suitable frictional and wear resistance characteristics (for example, thermoplastic resin made of a polyamide resin (PA) or the like). It should be noted that the first and second bearings 21, 22 may be integrally molded by the resin compound material formed by mixing with or adding to a resin material, a low sliding resistance material (e.g., fluorinated resin powder such as terafluorinated ethylene resin (PTFE)) for lowering a sliding resistance in relative movement between the valve shaft 5 of the intake flow control valve 4 and the first and second bearings 21, 22.

Next, a method of manufacturing the valve unit in the first embodiment will be briefly explained with reference to FIGS. 1A to 4B. The valve unit 2 in the first embodiment is manufactured by using an injection molding method of simultaneously and integrally molding the housing 3 and the intake flow control valve 4 with a thermoplastic resin inside a single die for injection molding (molding die). A pellet shaped resin material is heated and molten, a pressure is applied to the molten resin to be injected into a cavity of the die for injection molding, and then, the molten resin is cooled for solidification. Thereafter, the solidified resin is taken out of the die for injection molding by moving the die in a predetermined die cutting direction.

The valve unit 2 in the first embodiment is structured by simultaneously molding the housing 3 and the intake flow control valve 4 (one-piece resin molding) as shown in FIGS. 1A and 4A. At the time of simultaneously molding the housing 3 and the intake flow control valve 4, the valve body 6 is formed as extending upstream in the fluid flow path 9 (i.e., extending from the valve shaft 5 toward the upstream side of the housing 3). In other words, the valve body 6 is formed with the free end extending away from the downstream direction of the axis of the fluid flow path 9. In the embodiment shown, the valve body 6 is moldably formed extending approximately parallel to the axis of the fluid flow path 9. As such, the valve body 6 is formed such that the axis of the valve body 6 is approximately parallel to the direction of the dies when the valve unit 4 is removed from the dies. In the embodiment shown, the valve body 6 is formed as being rotatably positioned so as to be opposite (i.e., 180° away from) the fully open position. In this position, the valve body 6 extends out of the housing 3. With the valve body 6 in this position, a division type slide core can be moved along the upstream direction and the downstream direction of the axis of the flow path 9 to thereby form the housing 3 and the intake flow control valve 4.

Figure 10A:
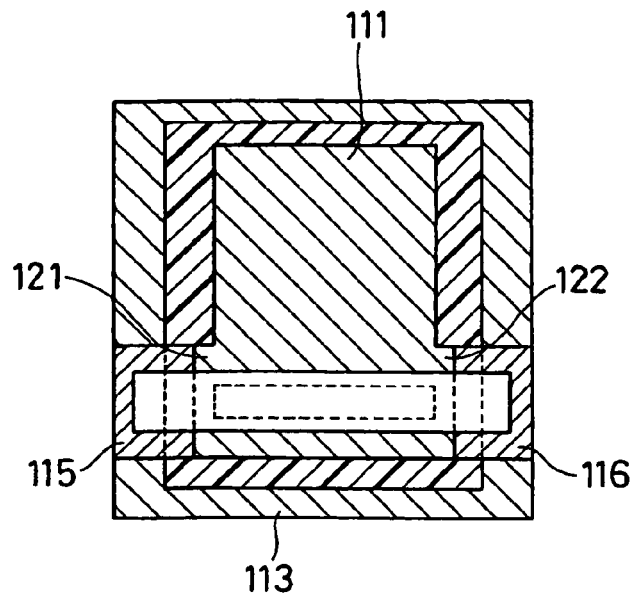
FIG. 10A is a sectional view of a die for injection molding of a valve unit of the prior art (i.e., comparison example 1)
Figure 10B:
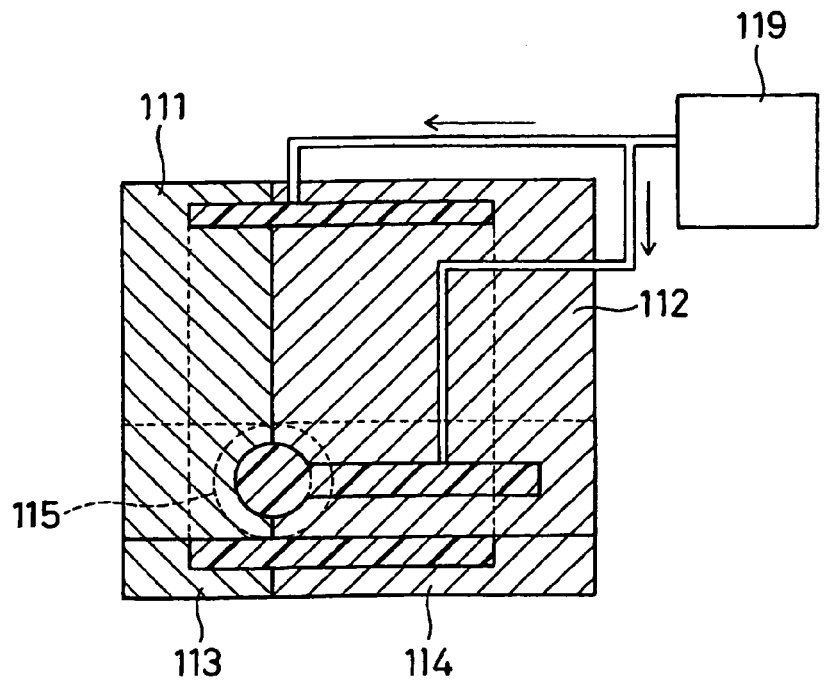
FIG. 10B is a sectional view of a die for injection molding of a valve unit of the prior art (i.e., comparison example 1)

In one embodiment, the division type slide core of the die for injection molding shares some of the same structure as the division slide cores 111-116 of the molding die for simultaneously molding the valve unit in the comparison example 1 shown in FIG. 10. However, the division type slide cores 111, 112 have a first and second protruding portions 121, 122 entering into the first and second recessed portions 131, 132. These protruding portions 121, 122 are unnecessary for the embodiment of FIGS. 1A-4B as will be explained.

Figure 9:
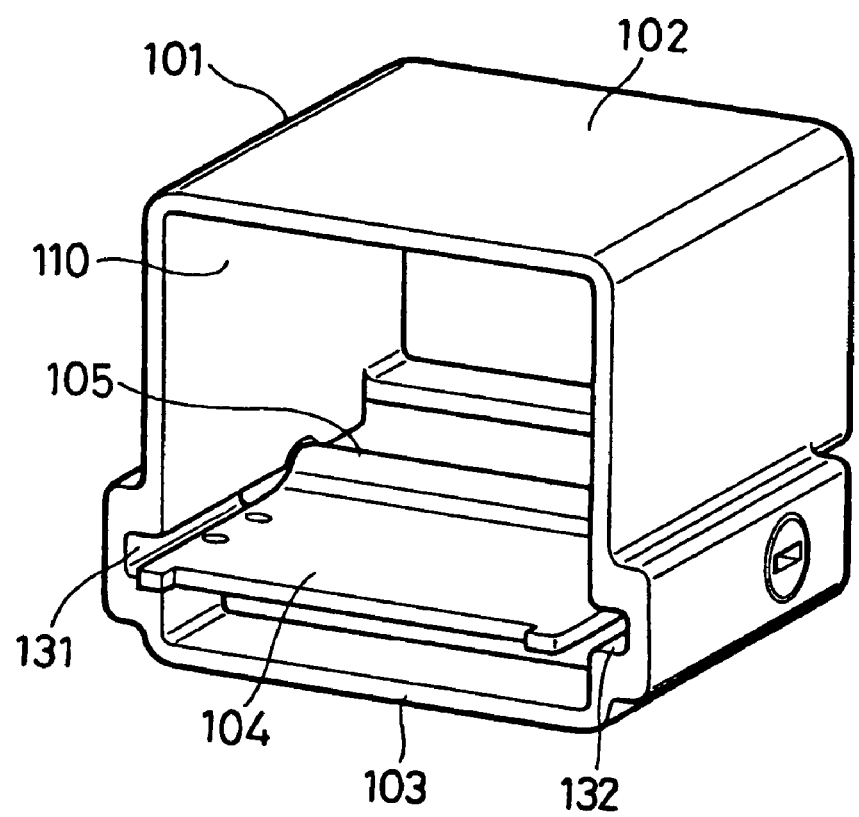
FIG. 9 is a perspective view of a valve unit of the prior art (i.e., comparison example 1)
Figure 12A:
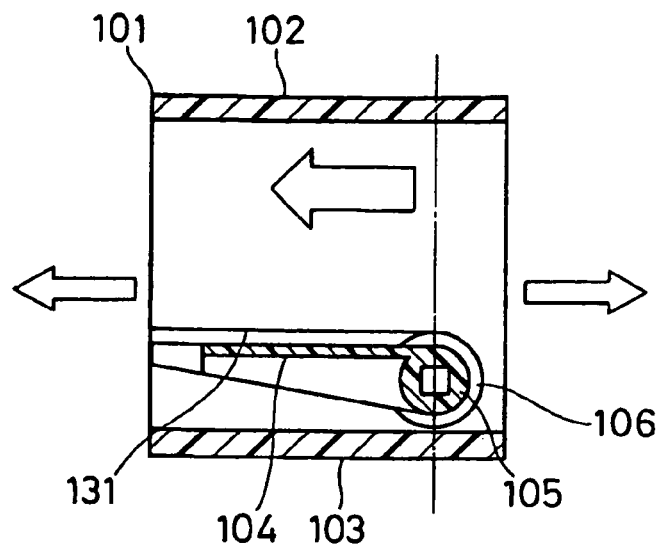
FIG. 12A is a sectional view of a valve unit of the prior art (i.e., comparison example 1)
Figure 12B:
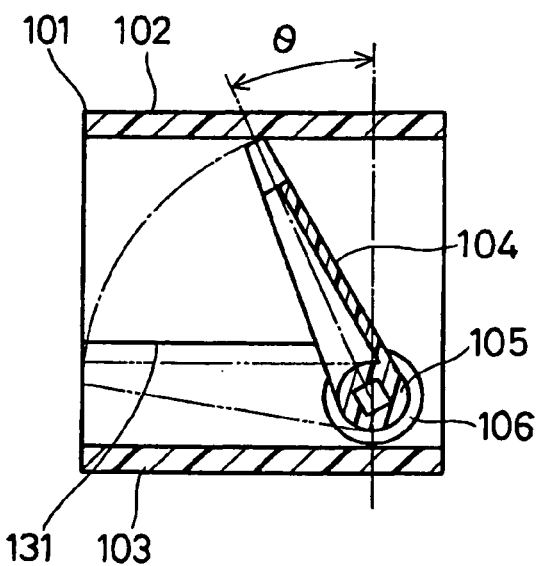
FIG. 12B is a sectional view of a valve unit of the prior art (i.e., comparison example 1).

Accordingly, in the valve unit in the comparison example 1, as shown in FIGS. 9 and 12A, the first and second recessed portions 131, 132 extend horizontally downstream from the through holes 106, 107. In contrast, in the valve unit 2 in the first embodiment, the first and second recessed portions 41, 42 extend from the upstream end of the housing 3 and end at the first and second bearing holes 35, 36.

The first and second recessed portions 41 and 42 extend in substantially the same direction with the direction the dies are moved for removing the valve unit 2 from the dies. Thus, the first and second walls 31, 32 are substantially flat and planar downstream of the rotational center of the intake flow control valve 4. As such, undesirable sounds are less likely to be generated when fluid flows through the fluid flow path 9, and a pressure loss is likely to be reduced.

FIG. 1A shows a thermoplastic resin product (resin molded element) which is integrally resin-molded by an injection molding method of simultaneously and integrally molding the housing 3 and the intake flow control valve 4 inside the die for injection molding. The housing 3 of the resin molded element (valve unit 2), as described above, includes the fluid flow path 9. The first to fourth walls (the first and second walls 31, 32, the top wall 33 and the bottom wall 34) surrounding the circumference of the fluid flow path 9 in a rectangular shape (or square shape) are integrally resin-molded.

The intake flow control valve 4 is integrally resin-molded to rotate relative to the housing 3 and includes the cylindrical valve shaft 5 and the sheet-shaped valve body 6. The valve shaft 5 is resin-molded and formed at the seam between the dies used for injection molding. The valve body 6 is resin-molded using dies and is formed as being oriented upstream as described above. A plurality of ribs 39 are also integrally resin-molded on the end surface at the back surface of the valve body 6.

When the housing 3 and the intake flow control valve 4 are formed, the cantilever intake flow control valve 4 having the valve shaft 5 is assembled inside the housing 3 in such a way as to move in the rotational direction and in the axial direction therein. Then, the first and second bearings 21 and 22 are assembled in an inner peripheral portions of the first and second holes 35, 36 from both end sides in the axial direction of the valve shaft 5 by press-fitting or the like. Thereby, both ends (first and second sliding portions) of the valve shaft 5 are slidably supported in the rotational direction inside each of the first and second bores of the first and second bearings 21, 22. Further, both end surfaces of the sheet-shaped valve body 6 of the intake flow control valve 4 are restricted by a tip in the press-fitting direction of the first and second bearings 21, 22 and therefore, an axial position of the intake flow control valve 4 is adjusted.

Thereafter, the intake flow control valve 4 is rotated around the axis of the valve shaft 5 from a position opposite the fully open position (illustrated in phantom lines in FIG. 4B) to a position beyond the fully closed position by elastically deforming the top wall 33 of the housing 3 and the valve body 6 (first assembly process).

Next, each of the plurality of the valve units 2 is assembled respectively in the respective engagement hole 11 of the casing 1. Thereby, the plurality of the valve units 2 are arranged by a predetermined interval inside the common casing 1 in the axial direction of the valve shaft 7.

Next, the intake flow control valve 4 of each of the plurality of the valve units 2 is set at a fully closed position inside the fluid flow path 9 of the housing 3 of each of the valve units 2 (second assembly process). That is, the tip (contacted portion) of each valve body 6 is made to abut the top wall 33 of each of the plurality of the housings 3. At this time, each of the plurality of the intake flow control valves 4 is arranged so as to be inclined by a predetermined rotational angle (fully closed angle θ). That is, a valve opening of the intake flow control valve 4 is set to a valve opening corresponding to the fully closed position. In one embodiment, the shaft through hole 10 provided in the valve shaft 5 of each of all the intake flow control valves 4 is arranged to be positioned on the same central axis line with each of all shaft through bores 15. Also, in the embodiment shown in FIG. 4B, when the valve 4 is in the fully closed position, the valve 4 is provided at a positive, acute angle with respect to the axis of the fluid flow path 9 and extends partially downstream.

Figure 2:
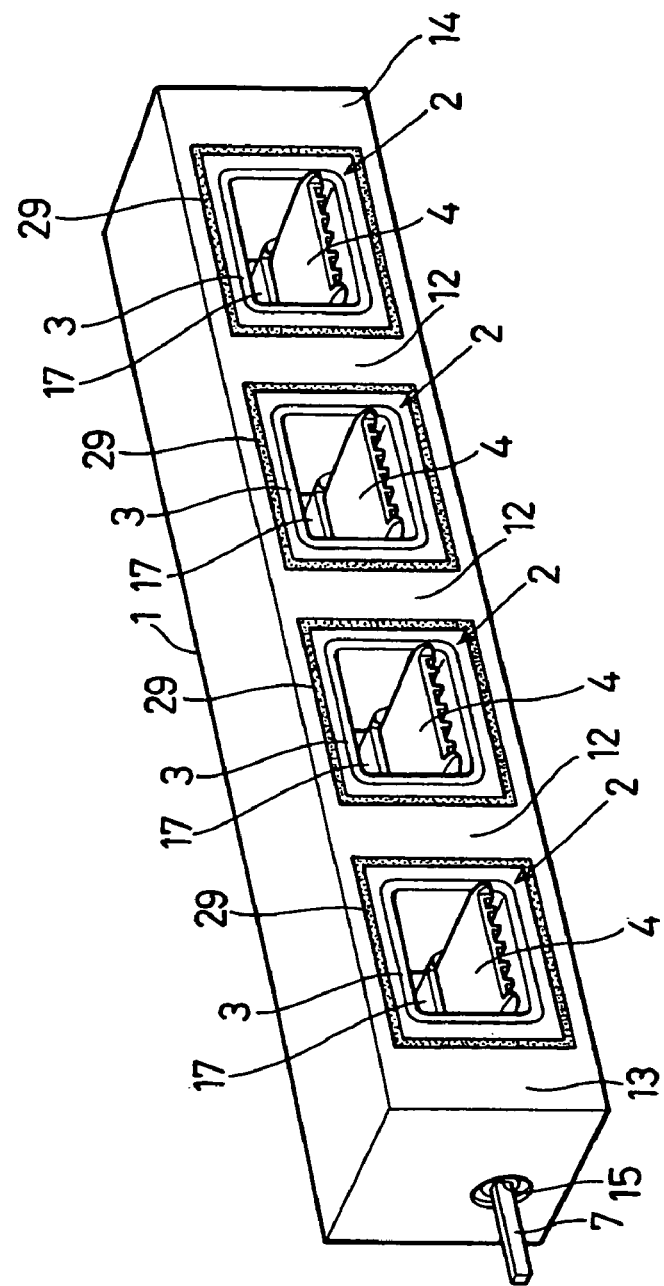
FIG. 2 is a perspective view showing an intake flow control device for an internal combustion engine in the first embodiment.

Next, as shown in FIGS. 2 and 3, the valve shaft 7 is extended through the shaft through bore 15 of the left wall 13 in the casing 1, the shaft through holes 10 of all the intake flow control valves 4 and the shaft through bores 15 of all the division walls 12 in the casing 1, and is press-fit into the shaft through bore 15 of the right wall 14 in the casing 1. Thereby, all the intake flow control valves 4 are integrally connected to the outer periphery of the single valve shaft 7 in such a way that the valve openings may uniformly changed by rotating the single valve shaft 7.

In addition, the casing 1, the plurality of the valve units 2 and the valve shaft 7 are integrated to form an intake flow generating device. The intake flow generating device is assembled to the intake system of the engine, i.e., the cylinder head of the engine (or intake manifold), so that the plurality of the intake flow control valves 4 can be opened/closed all together by the valve operating device, that is, the intake flow control valves 4 are mounted to the engine to be operated. For example, in a case where the intake flow control valve 4 is driven in the valve-closing direction from a fully open position and is stopped at a fully closed position, the tip (contacted portion) of the sheet-shaped valve body 6 of the intake flow control valve 4 can abut the top wall 33 of the housings 3. Accordingly, at the time when the intake flow control valve 4 is fully closed, a gap between the top wall 33 of the housing 3 and the tip of the sheet-shaped valve body 6 of the intake flow control valve 4 becomes a predetermined minimum value, making it possible to set a leakage air quantity at the fully closed position of the intake flow control valve 4 at the predetermined minimum value.

An operation of the intake flow control device for an internal combustion engine (intake flow generating device) in the first embodiment will be briefly explained with reference to FIGS. 1B to 3.

The ECU energizes the electric motor so that each intake flow control valve 4 of the plurality of the valve units 2 is fully closed when an engine is in a predetermined operating condition (e.g., at the engine startup time or at an idle operating condition). When the electric motor is energized, a rotational output (motor output shaft torque) of the electric motor is transmitted to the single valve shaft 7 through the gear reduction mechanism. Thereby, valve opening position of each of the intake flow control valves 4 is changed by the single valve shaft 7 simultaneously. That is, the valve opening (valve position) of each of all the intake flow control valves 4 is changed from a fully open position (refer to FIGS. 1B to 3) to a fully closed position.

Thereby, the intake air filtered in the air cleaner flows into the fluid flow path 9 of each housing 3 for each of the plurality of the valve units 2 via the intake passage of the intake duct (throttle body or surge tank), the intake manifold or the plurality of the fluid flow paths 8 of the casing 1. At this time, since the valve opening (valve position) of each of the plurality of the intake flow control valves 4 is set in a fully closed position, one side (upper layer side)-deflected ventilation state is created only by the open portion 37 formed at the tip (top end side in the figure) of the valve body 6 of each of all the intake flow control valves 4. The intake air deflected to the one side (upper end side) of the fluid flow path 9 passing through the plurality of the open portions 37 is supplied to the intake port of the cylinder head and passes around the circumference of the intake valve to be introduced into the combustion chamber for each cylinder. At this time, since almost all of the intake air introduced into the combustion chamber passes through the open portion 37 of each of the plurality of the intake flow control valves 4, the flow of the intake air introduced into the combustion chamber results in a longitudinal intake swirl (tumble flow).

That is, when all the intake flow control valves 4 of the plurality of the valve units 2 are fully closed, a mixture can be introduced into the combustion chamber for each cylinder of the engine body via the upper parts of the plurality of the fluid flow paths 8, the plurality of the fluid flow paths 9 and the plurality of the intake ports. Therefore, the longitudinal intake swirl (tumble flow) can be easily generated in the combustion chamber for each cylinder of the engine body. As a result, the tumble flow for promoting the combustion of the mixture can be actively generated in the combustion chamber for each cylinder of the engine body, leading to an improvement on fuel economy without deterioration of an engine performance. In addition, generation of the longitudinal intake swirl (tumble flow) causes promotion of the combustion velocity in the combustion chamber and an improvement of a combustion efficiency. Therefore, a fuel economy and an exhaust emission performance can be improved when the engine is in a predetermined condition (e.g., at an idle operating condition).

Here, in the first embodiment, when the engine is in a predetermined condition, the electric motor is energized to control the valve opening (valve position) of each of all the intake flow control valves 4 to be at a fully closed position. That is, the normal-open type intake flow control valve 4 is driven to be closed by the valve drive device. In contrast, when the engine is at a predetermined condition, the power supply to the electric motor may be stopped to control the valve opening (valve position) of the intake flow control valves 4 to be in a fully closed position by a biasing force of a coil spring. In this case, a normal-closed type intake flow control valve is used.

As described above, the intake flow control valve 4 in the valve unit 2 in the first embodiment valve includes the valve body 6. The valve body 6 is formed as extending from the valve shaft 5 toward the upstream side of the fluid flow path 9 formed inside the housing 3. More specifically, in the embodiment shown, the valve body 6 is formed as extending opposite to the fully open position of the valve body 6. Thus, the first and second walls 31, 32 are substantially flat and planar downstream of the rotational center of the intake flow control valve 4. As such, undesirable sounds are less likely to be generated when fluid flows through the fluid flow path 9, and a pressure loss is likely to be reduced.

In addition, the valve shaft 5 of the intake flow control valve 4 of the valve unit 2 in the first embodiment is adjacent to the bottom wall 34 and is spaced further away from the top wall 33, and the valve shaft 5 is adjacent the upstream side of the housing 3 and is spaced further away from the downstream side of the housing 3. This causes substantial reduction in the axial length of the first and second recessed portions 41, 42. Thus, even in a case where a protruding portion is provided in the outer surface of the housing 3 to accommodate for the reduced wall thickness near the first and second recessed portions 41, 42, the protruding portion can be relatively small and therefore, the entire valve unit 2 can be made smaller. As a result, the valve unit 2 can be more easily mounted.

Second Embodiment

Figure 5A:
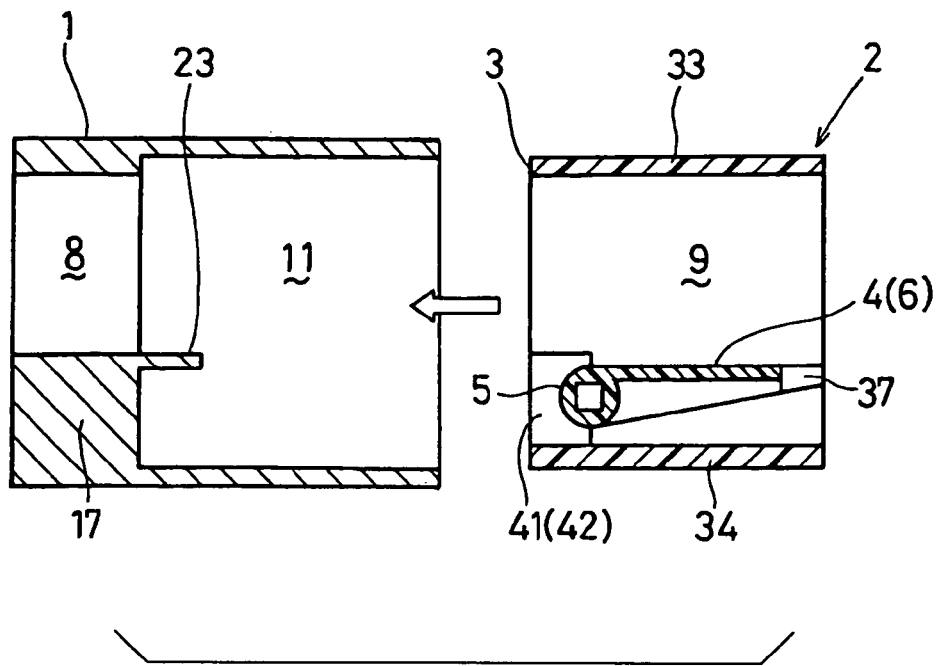
FIG. 5A is an exploded sectional view of an intake flow control device in a second embodiment.
Figure 5B:
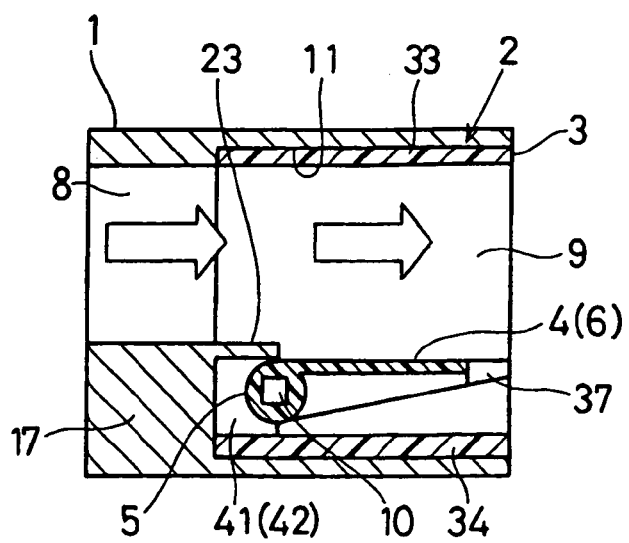
FIG. 5B is a sectional view of the intake flow control device of FIG. 5A.

FIGS. 5A and 5B show a second embodiment of a flow control device (e.g., for an internal combustion engine). Similar to the first embodiment described above, the first and second recessed portions 41, 42 are formed upstream of the valve shaft 5.

However, in this embodiment, a block 17 and a partition wall 23 are included in the casing 1. The block 17 and the partition wall 23 are integrally formed (one-piece resin molding) with the casing 1 so as to be located upstream of the valve unit 2. The block 17 is upstream of the valve unit 2, and the partition wall 23 extends from the block 17 so as to abut against the valve 4. The block 17 and the partition wall 23 obstructs the first and second recessed portions 41, 42 such that fluid is diverted from flowing into the first and second recessed portions 41, 42. Therefore, occurrence of abnormal sounds and pressure losses are less likely. This also maintains the desired intake air flow quantity at the fully open position of the intake control valve 4.

Third Embodiment

Figure 6A:
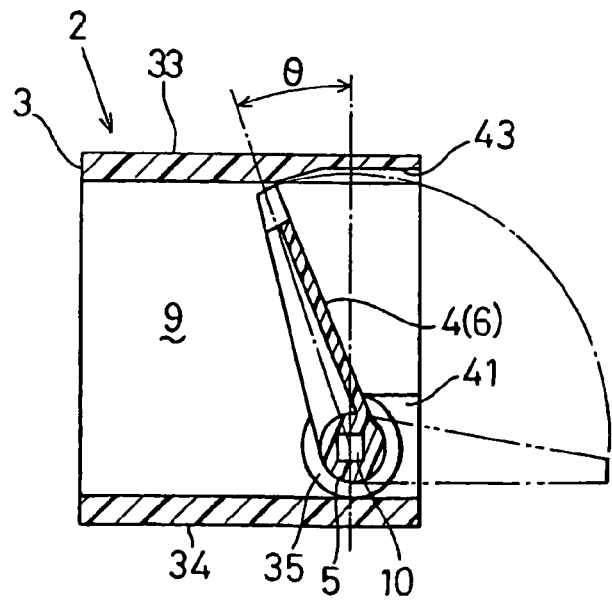
FIG. 6A is a sectional view of a valve unit of a third embodiment.
Figure 6B:
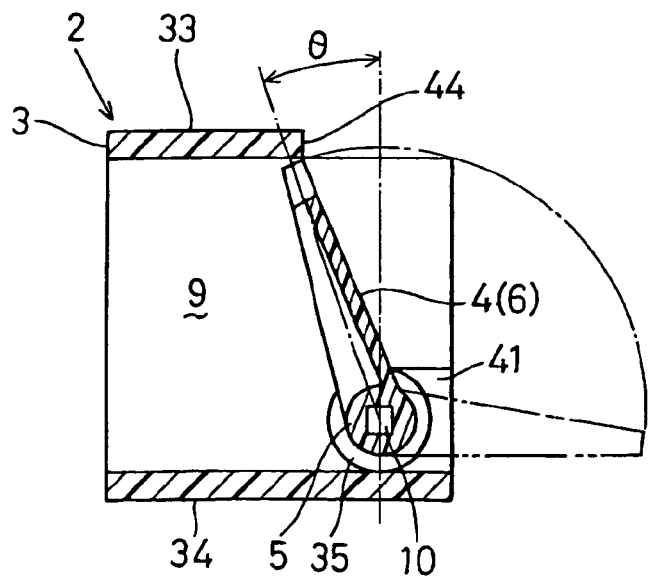
FIG. 6B is a sectional view of the valve unit of FIG. 6A.

FIGS. 6A and 6B show a third embodiment and a method of manufacturing the valve unit 2. In the embodiment, a relief is provided in the top wall 33 of the housing 3. The relief is provided to facilitate rotation of the valve body 6 from a position opposite from the fully open position (shown in phantom lines) to the fully closed position (shown in solid lines) as will be discussed.

In the embodiment of FIG. 6A, the relief is a relief groove 43 provided in the top wall 33 of the housing 3. The relief groove 43 is formed during the injection molding process described above. In the embodiment shown, the relief groove 43 is shaped such that a cross section thereof (taken along the plane of FIG. 6A) is a minor segment of a circle (i.e., a region enclosed by a chord and an arc of a circle). The relief groove 43 is approximately centered above the rotational axis of the valve body 6. The relief groove 43 is provided along a rotational trace of the intake flow control valve 4 around the axis of the valve shaft 5. As such, the free end of the valve body 6 can enter the relief groove 43 as the valve body 6 rotates away from the position opposite the fully open position (shown in phantom lines) and toward the fully closed position (shown in solid lines).

In the embodiment of FIG. 6B, the relief is a relief opening 44 provided in the top wall 33 of the housing 3. The relief opening 44 is formed during the injection molding process described above. In the embodiment shown, the relief opening 44 extends completely through the top wall 33 of the housing. The relief opening 44 is centered above the rotational axis of the valve body 6. The relief opening 44 is provided along a rotational trace of the intake flow control valve 4 around the axis of the valve shaft 5. As such, the free end of the valve body 6 can enter the relief opening 44 as the valve body 6 rotates away from the position opposite the fully open position (shown in phantom lines) and toward the fully closed position (shown in solid lines).

The valve body 6 extends upstream (shown in phantom lines) when formed during injection molding of the valve unit 2. Once removed from the mold, the valve body 6 is rotated past the fully closed position (shown in solid lines). In one embodiment, the fee end of the valve body 6 abuts the top wall 33 at the edge of the relief groove 43 (relief opening 44) when the valve body 6 is in the fully closed position. Thus, the intake flow control valve 4 is positioned at a predetermined rotational angle (fully closed angle, θ) and extends partially toward the downstream direction of the fluid flow path 9.

Furthermore, in one embodiment, the casing 1 includes a block and/or partition wall similar to the embodiment of FIGS. 5A and 5B to thereby obstruct air flow into the relief groove 43 (relief opening 44).

Fourth Embodiment

FIGS. 7A and 7B and FIGS. 8A and 8B show a fourth embodiment and a method of manufacturing the valve unit.

Figure 7A:
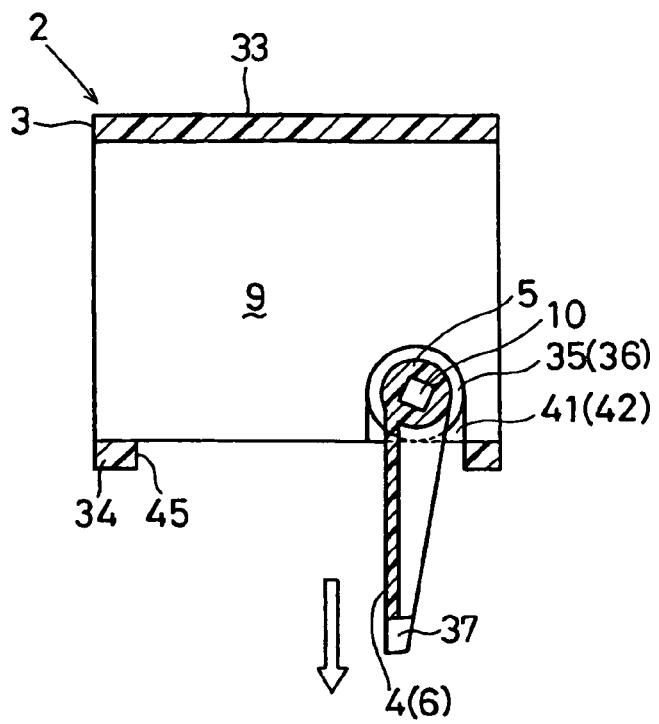
FIG. 7A is a sectional view of the valve unit of a fourth embodiment.
Figure 7B:
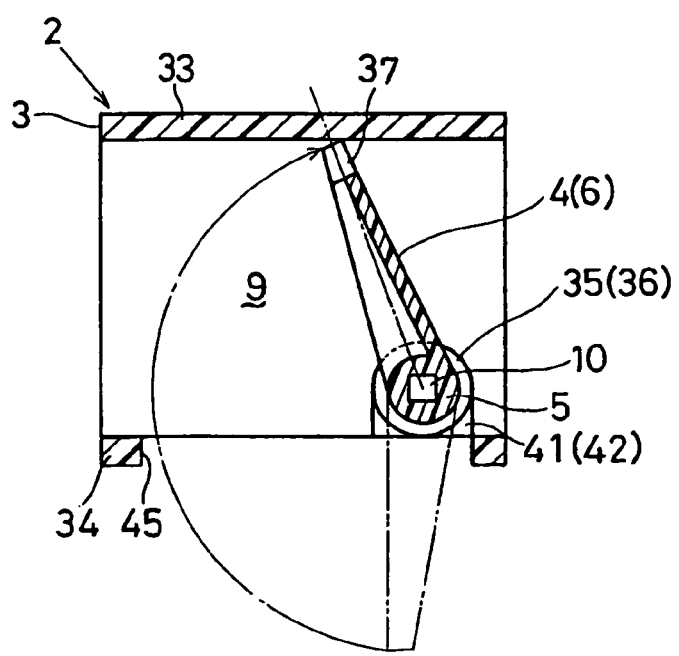
FIG. 7B is a sectional view of the valve unit of FIG. 7A.
Figure 8A:
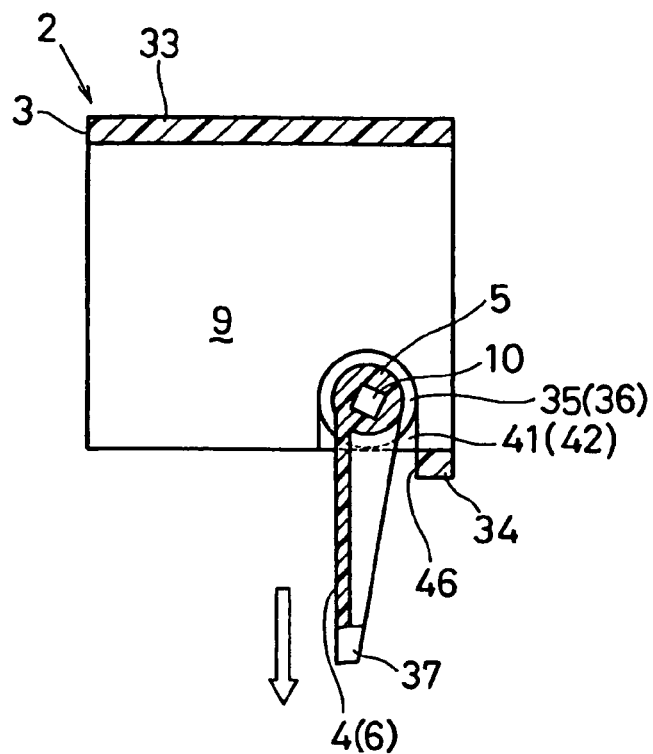
FIG. 8A is a sectional view of the valve unit of FIG. 7A.
Figure 8B:
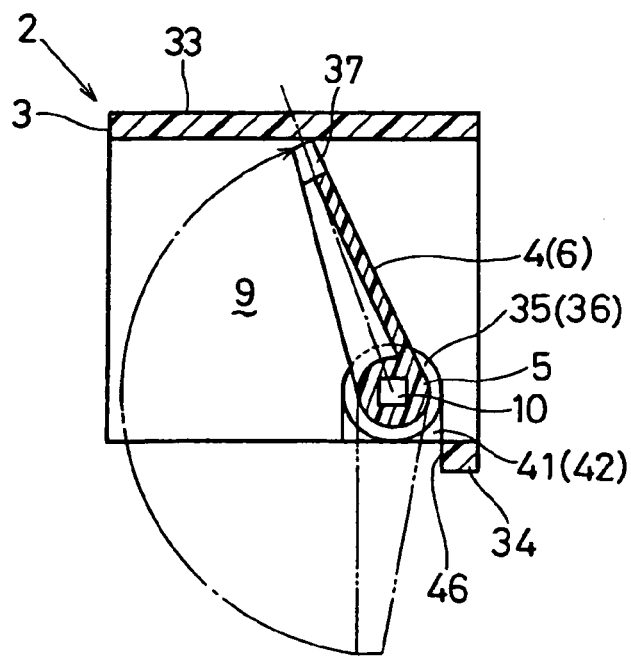
FIG. 8B is a sectional view of the valve unit of FIG. 7A.

The housing 3 of the valve unit 2 in the fourth embodiment, as shown in FIGS. 7A and 7B and FIGS. 8A and 8B, includes an opening 45, 46, respectively, in the bottom wall 34 of the housing 3. The opening 45 of the embodiment of FIGS. 7A and 7B is small enough such that a portion of the bottom wall 34 remains downstream of the valve body 6. The opening 46 of the embodiment of FIGS. 7A and 7B is large enough such that the bottom wall 34 is included only upstream of the valve body 6. It will be appreciated that side portions of the bottom wall 34 (i.e., portions perpendicular to the axis of the flow path 9).

Also, the first and second recessed portions 41, 42 are included similar to the embodiments described above. However, the first and second recessed portions 41, 42 extend approximately perpendicular to the axis of the flow path 9.

The valve unit 2 is manufactured via injection molding processes. In this embodiment, the valve body 6 is formed in the die extending approximately perpendicular to the axis of the flow path 9 such that the free end of the valve body 6 extends through the opening 45, 46 (shown in solid lines in FIGS. 7A and 8A and shown in phantom lines in FIGS. 7B and 8B). It is understood that the first and second recessed portions 41, 42 and the opening 45 (46) are also formed by the same die. Then, to remove the valve unit 2 from the dies, the die is moved perpendicular to and away from the axis of the flow path 9 (as represented by an arrow in FIGS. 7A and 8A).

Once the valve unit 2 is removed from the die, the valve body 6 is moved toward the fully closed position to abut against the top wall 33 of the housing 3. More specifically, the valve body 6 is rotated through and out of the opening 45 (46) toward and abuts the top wall 33. Thus, the intake flow control valve 4 is positioned at a predetermined rotational angle (fully closed angle, θ) and extends partially toward the downstream direction of the fluid flow path 9.

Thus, the housing 3 has substantially flat walls. This reduces noise and reduces the likelihood of pressure loss in the fluid flow path 9.

Furthermore, in one embodiment, the casing 1 includes a block and/or partition wall similar to the embodiment of FIGS. 5A and 5B to thereby obstruct air flow into the openings 45, 46 and the first and second recessed portions 41, 42.

Modification

It is understood that the valve unit could be incorporated into any valve assembly for controlling flow of any suitable fluid.

Furthermore, in the above embodiments, the intake flow control device for the internal combustion engine (intake flow generating device or swirl generating device) is adapted to generate a longitudinal intake swirl (tumble flow) for promoting combustion in the combustion chamber for each cylinder of the engine body. In another embodiment, the intake flow control device for the internal combustion engine (intake flow generating device or swirl generating device) is adapted to generate a later intake swirl (swirl flow) for promoting combustion of the mixture in the combustion chamber for each cylinder of the engine body. In addition, the intake flow control device for the internal combustion engine (intake flow generating device or swirl generating device) may be adapted to generate a squish swirl for promoting combustion of the mixture in the combustion chamber for each cylinder of the engine body.

In the above embodiments, the valve unit is incorporated in the intake flow control device for the internal combustion engine for controlling intake air aspired into the combustion chamber for each cylinder of the engine. However, the valve unit may be incorporated into an intake control device for the engine for controlling an intake air aspired into the combustion chamber for each cylinder of the engine. In this case, an intake flow quantity-controlling valve such as an idle rotational speed-controlling valve and a throttle valve is incorporated into the housing. In addition, the valve unit may be applied to an exhaust gas recirculation device (EGR control valve unit) equipped with a housing having an fluid flow path communicated with an exhaust gas recirculation path for recirculating a part of an exhaust gas of the engine (EGR gas) from an exhaust system to an intake system and an EGR control valve received in the housing so as to open/close therein for controlling an exhaust gas recirculation quantity. Further, the valve unit may be applied to an exhaust gas control valve unit equipped with a housing having an fluid flow path communicated with an exhaust passage of the engine and an exhaust control valve received in the housing so as to open/close for controlling an exhaust gas emitted from the cylinders of the engine.

In addition, the valve unit may be incorporated into a variable intake device for an internal combustion engine equipped with a variable intake valve. The variable intake valve is an intake control valve of the engine for varying a passage length or a passage area of an intake passage for an intake manifold in response to an engine rotational speed. It should be noted that the variable intake device for the engine is structured so that, for example, when an engine rotational speed is in a low/intermediate rotational range, the variable intake valve switches an intake passage in such a way as to extend a passage length of the intake passage for the intake manifold or when the engine rotational speed in a high rotational range, the variable intake valve switches an intake passage in such a way as to shorten a passage length of the intake passage for the intake manifold. Thus, this device can improve engine output shaft torque (engine torque) regardless of an engine rotational speed. As to the fluid to be used, not only gas such as intake air or exhaust gas is used but also fluid such as water, oil or fuel may be used.

In the above embodiments, the valve drive device for closing (or opening) the intake flow control valve 4 of the valve unit 2 is composed of an electric actuator equipped with a power unit including an electric motor and a power transmission mechanism (for example, gear reduction mechanism). However, the valve drive device for opening/closing valves may be composed of a vacuum operated actuator equipped with an electromagnetic or electric vacuum control valve or an electromagnetic actuator. In addition, valve-biasing means such as a spring for urging valves in the valve-opening or closing direction may not be installed.

In the above embodiments, the valve unit is mounted in an intake system (or exhaust system) of the engine with an in-line four-cylinder where cylinders are arranged in a group. However, the valve unit may be mounted in an intake system (or exhaust system) with a plurality of banks in each of which cylinders arranged in a group. Such engine includes a multi-cylinder engine such as a V type engine, a horizontal type engine and a horizontally opposed engine. In the above embodiments, the first and second bearings 21, 22 are resin-molded, but may be made of metal. In addition, the valve is not limited to a one-piece multi type valve, but may be a single cantilever valve so long as it is a valve integral with a valve shaft.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A method of manufacturing a valve unit comprising:
providing a plurality of injection molding dies that define a cavity corresponding in shape to the valve unit, wherein the valve unit includes a housing and a valve, wherein the housing defines a fluid flow path with an axis having an upstream direction and a downstream direction corresponding to a predetermined direction of fluid flow in the fluid flow path, wherein the valve is cantilevered and includes a valve body having a coupled end rotationally coupled to the housing and a free end, and wherein the valve body rotates about the coupled end to thereby change flow through the fluid flow path;
simultaneously molding the housing and the valve within the cavity such that the valve body is formed with the free end extending away from the downstream direction of the axis of the fluid path; and
wherein the housing includes a first recessed portion and a second recessed portion that are upstream of the valve body and that extend away from the downstream direction of the axis of the fluid flow path.

2. The method of manufacturing a valve unit according to claim 1, wherein the valve body can be positioned in a fully open position, and where the simultaneous molding of the housing and the valve occurs such that the valve body is formed at a position approximately opposite to the fully open position.

3. A method of manufacturing a valve unit according to claim 1, wherein:
the housing includes a downstream end and an upstream end corresponding to the predetermined direction of fluid flow in the fluid flow path,
the housing further includes a first wall and a second wall opposing the first wall, the coupled end of the valve body is provided nearer the upstream end as compared to the downstream end, and
the coupled end of the valve body is provided nearer the first wall as compared to the second wall.

4. A method of manufacturing a valve unit according to claim 1, wherein the valve includes a valve shaft at the coupled end of the valve body, wherein the valve shaft protrudes from opposite sides of the valve body, and wherein the valve shaft is rotationally coupled to housing.

5. A method of manufacturing a valve unit according to claim 1, further comprising providing a casing that couples to the housing, wherein the casing includes at least one of a block and a partition wall for obstructing the first and second recessed portions such that fluid is diverted from flowing into the first and second recessed portions.

6. A method of manufacturing a valve unit according to claim 1, wherein the valve body can be positioned in a fully closed position, the method further comprising:
removing the valve unit from the dies; and rotating the valve to thereby elastically deform at least one of the valve body and the housing such that the valve can be positioned in the fully closed position.

7. A method of manufacturing a valve unit according claim 1, wherein the valve body can be positioned in a fully closed position and a fully open position, wherein the housing includes a relief, and wherein the valve body at least partially enters the relief when rotating from a position opposite from the fully open position to the fully closed position.

8. A method of manufacturing a valve unit according to claim 1, wherein the valve body can be positioned in a fully closed position in which an axis of the valve body is provided at a positive, acute angle with respect to the axis of the fluid flow path.

9. A method of manufacturing a valve unit according to claim 1, wherein the housing includes an opening, and wherein the valve body is formed with the free end extending approximately perpendicular to the axis of the flow path and such that the free end of the valve body extends through the opening.

10. A method of manufacturing a valve unit according to claim 1, wherein the housing includes a first recessed portion and a second recessed portion that extend approximately perpendicularly away from the axis of the fluid flow path.

11. A method of manufacturing a valve unit according to claim 10, further comprising providing a casing that couples to the housing, wherein the casing includes at least one of a block and a partition wall for obstructing the first and second recessed portions such that fluid is diverted from flowing into the first and second recessed portions.

12. A method of manufacturing a valve unit according to claim 10, wherein simultaneously molding the housing and the valve within the cavity comprises forming the valve body with the free end extending out of the housing.

* * * * *